UNITED STATES PATENT OFFICE.

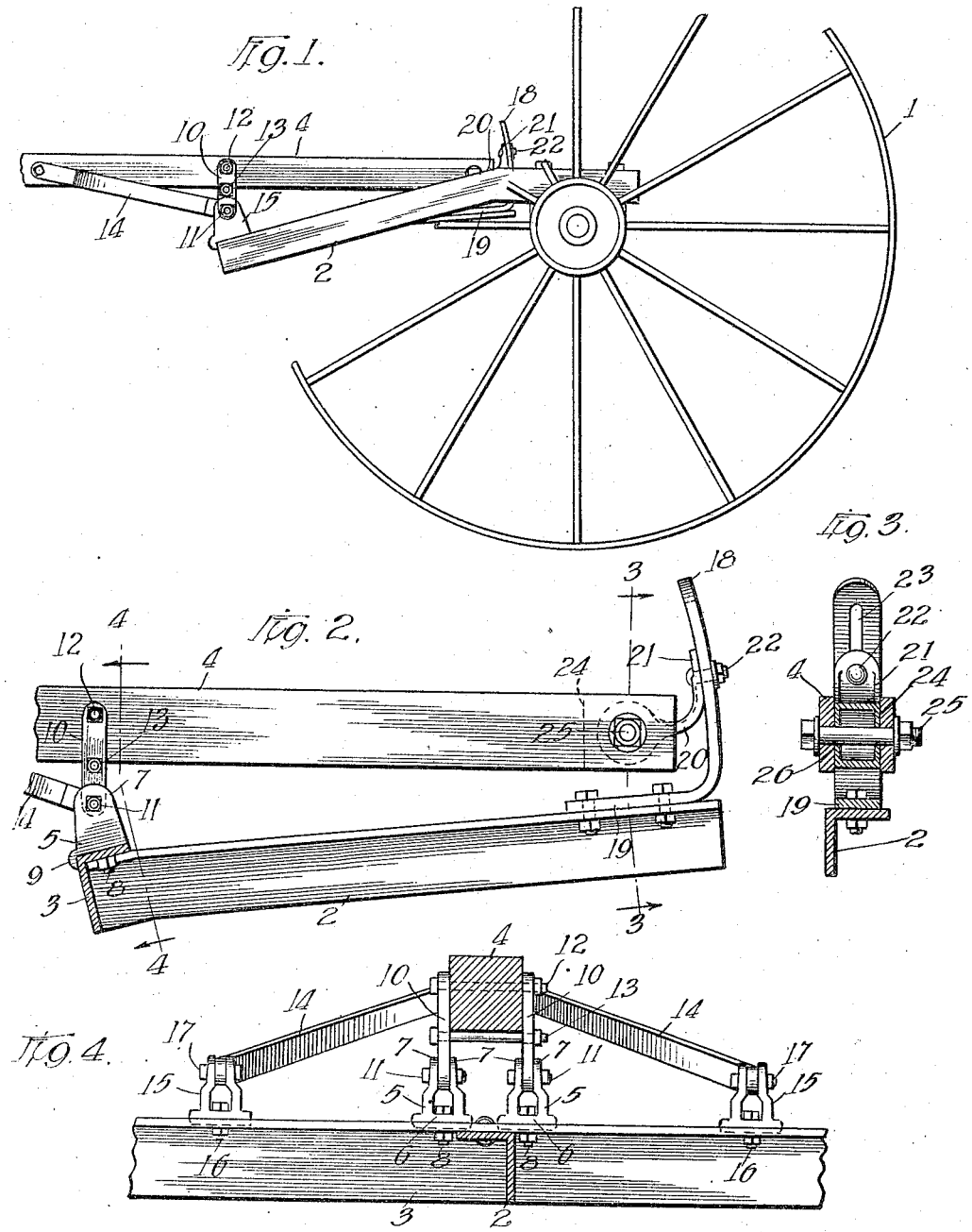

HARRISON B. BOZARD, OF KANKAKEE, ILLINOIS, ASSIGNOR TO SEARS, ROEBUCK AND COMPANY, OF CHICAGO, ILLINOIS, A CORPORATION OF NEW YORK.

AGRICULTURAL IMPLEMENT.

1,238,095.   Specification of Letters Patent.   Patented Aug. 28, 1917.

Application filed November 28, 1916. Serial No. 133,929.

*To all whom it may concern:*

Be it known that I, HARRISON B. BOZARD, a citizen of the United States, residing at Kankakee, in the county of Kankakee and State of Illinois, have invented certain new and useful Improvements in Agricultural Implements, of which the following is a specification.

Owing to differences in the size of horses and arrangement of harness, the distance of the front end of the tongue of an implement from the ground varies, and hence it is desirable to provide an adjustment between the tongue and the frame of a two-wheeled agricultural implement in order that when the tongue is attached to the neck-yoke the frame of the implement and the mechanisms attached to said frame may be balanced on the wheels. If the frame and mechanisms are not properly balanced on the wheels, a greater or less portion of the weight of the machine is transmitted through the tongue and the neck-yoke to the horses, and, moreover, the mechanisms are not properly located with reference to the work to be performed.

The object of this invention is to provide improved means for adjustably connecting the tongue to the frame, whereby the mechanisms attached to the frame may be placed in proper position, and the horses relieved of the weight of the machine.

In the accompanying drawings, Figure 1 is a fragmental side elevation of an agricultural implement embodying the features of my invention. Fig. 2 is an enlarged fragmental view. Figs. 3 and 4 are sectional views taken in the planes of dotted lines 3—3 and 4—4, respectively, of Fig. 2.

In the drawings, 1 denotes one of the two supporting wheels of the implement, and 2 refers to the frame. It will be understood that the wheels and frame may be of any character suited to the particular type of implement with which the invention is to be used. In the present embodiment, the frame 2 extends forwardly of the axle upon which the wheels are mounted, and comprises a horizontal front bar 3.

The tongue or pole 4 is connected to the bar 3 by means of two clips or brackets 5, each of which clips consists of a base 6 and two lugs 7. Preferably each clip consists of an integral casting. The clips are secured to the bar 3 by means of bolts 8 extending through holes in the base 6 and the bar 3. To prevent the clip from turning on the bar 3, the base of the clip is provided with an angular flange 9 that lies against the bar 3.

A metal strap 10 is pivoted at its lower end between the lugs 7 of each clip 5 by means of a bolt 11. The upper portions of the straps 10 extend at opposite sides of the tongue 4, and are secured to the tongue by a bolt 12 extending through the tongue. Another bolt 13 connects the straps 10 directly below the tongue and assists to support the tongue.

Two braces 14 are rigidly bolted at their forward ends to opposite sides of the tongue. The braces 14 diverge rearwardly, and are connected at their rear ends to clips 15 which preferably are identical in construction with the clips 5. The clips 15 are secured to the bar 3 by means of bolts 16. The bolts 17 that pivotally connect the braces 14 to the clips 15 are alined with the pivot bolts 11. It will be seen that the tongue is mounted to swing on the axis of the bolts 11 and 17.

The rear end of the tongue is adjustably secured to the frame by means including a bracket 18. The base 19 of the bracket is rigidly secured to the frame 2 in any suitable manner. The bracket 18 is curved upon the arc of a circle concentric with the axis upon which the tongue is mounted. A rocker arm 20 is secured to the rear end of the tongue, said rocker arm comprising a portion 21 which is curved on the same arc as the bracket 18. The portion 21 may be rigidly clamped to the bracket 18 by means of a bolt 22 extending through an opening in said portion and through a vertical slot 23 in the bracket.

The rocker arm 20 is secured within a recess 24 in the rear end of the tongue. That portion of the rocker arm which lies in the recess 24 is broadened into generally cylindrical form and has flat sides that lie in contact with opposite walls of the recess 24. A bolt 25 extends through the tongue and through a hole 26 in the rocker arm.

A double-tree or other suitable draft appliance (not shown) is connected to the bar 3.

In practice, the farmer hitches the team to the implement, the forward end of the tongue being connected to the neck-yoke. If the frame 2 and the mechanisms carried thereby are not properly balanced on the wheels, the farmer loosens the bolt 22 and adjusts the rocker arm 20 up or down on the bracket 18 until the machine is properly balanced, and then tightens up said bolt. The horses are thus relieved of the weight of the machine.

It will be seen that the bracket 18 and the rocker arm have relatively large surfaces in contact, thereby insuring a secure and effective connection between said parts.

When adjustment of the tongue is required, the bolt 25 may, if necessary, be loosened so as to allow the rocker arm to adjust itself with relation to the tongue when the bolt 22 is tightened. After the bolt 22 has been drawn up tight, the bolt 25 may be tightened to secure the rocker arm rigidly to the tongue.

I claim as my invention:

1. A two-wheeled agricultural implement having, in combination, a frame, a tongue pivoted on the frame, a bracket on the frame, said bracket having a portion curved upon the arc of a circle concentric with the axis of the tongue, a rocker arm attached to the rear end of the tongue and having a portion curved on the arc of said circle, said bracket being vertically slotted, and a bolt extending through said slot and through the rocker arm and rigidly securing together the rocker arm and the bracket with said curved portions in contact with each other.

2. A two-wheeled agricultural implement having, in combination, a frame comprising a horizontal front bar, two brackets fixed to said bar, two straps each pivoted at its lower end to one of said brackets, a tongue, said straps extending upwardly at opposite sides of the tongue and being secured thereto, two braces secured at their forward ends to opposite sides of the tongue forwardly of said brackets, said braces diverging rearwardly, and two brackets fixed to the front bar, the rear ends of said braces being pivoted to the last mentioned brackets, the pivots of said braces and straps being alined, and means engaging the rear end of the tongue for securing the tongue in adjusted position.

In testimony whereof, I have hereunto set my hand.

HARRISON B. BOZARD.

Copies of this patent may be obtained for five cents each, by addressing the "Commissioner of Patents, Washington, D. C."